(12) United States Patent
Batkilim et al.

(10) Patent No.: US 6,597,811 B1
(45) Date of Patent: Jul. 22, 2003

(54) METHOD AND DEVICE FOR IMAGE DIGITIZED DATA COMPRESSION AND DECOMPRESSION

(76) Inventors: Eduard Batkilim, 18/1 Haruv Street, Nesher (IL); Gil Timnat, 14 Haassif Street, Haifa, 34637 (IL); Alex Feldman, Golomb 16/39, Haifa, 33792 (IL)

(*) Notice: Subject to any disclaimer, the term of this patent is extended or adjusted under 35 U.S.C. 154(b) by 0 days.

(21) Appl. No.: 09/534,961

(22) Filed: Mar. 27, 2000

(51) Int. Cl.[7] .................................................. G06K 9/36
(52) U.S. Cl. ...................................................... 382/232
(58) Field of Search ................................ 382/232, 236, 382/238, 240, 248, 250; 348/384.1, 394.1–395.1, 400.1–404.1, 407.1–416.1, 420.1, 421.1, 425.2, 430.1, 431.1; 375/240.02, 240.03, 240.12–240.16, 240.18, 240.2, 240.22–240.25

(56) References Cited

U.S. PATENT DOCUMENTS

| | | | | |
|---|---|---|---|---|
| 4,987,480 A | * | 1/1991 | Lippman et al. | 375/240.11 |
| 5,122,873 A | * | 6/1992 | Golin | 382/240 |
| 5,341,442 A | * | 8/1994 | Barrett | 382/166 |
| 5,379,351 A | * | 1/1995 | Fandrianto et al. | 382/276 |
| 5,565,920 A | * | 10/1996 | Lee et al. | 348/398 |
| 6,125,201 A | * | 9/2000 | Zador | 382/166 |
| 6,175,592 B1 | * | 1/2001 | Kim et al. | 375/240 |
| 6,233,279 B1 | * | 5/2001 | Boon | 375/240.08 |

* cited by examiner

*Primary Examiner*—Jose L. Couso
(74) *Attorney, Agent, or Firm*—Mark M. Friedman

(57) ABSTRACT

A method for enhancing compression of still images, in particular those compressed by the JPEG method, and for enhancing compression of motion pictures, in particular those using the MPEG-1, MPEG-2 methods and relevant methods that use the JPEG intra-frame compression.

19 Claims, 3 Drawing Sheets

Block-diagram of the coding algorithm.

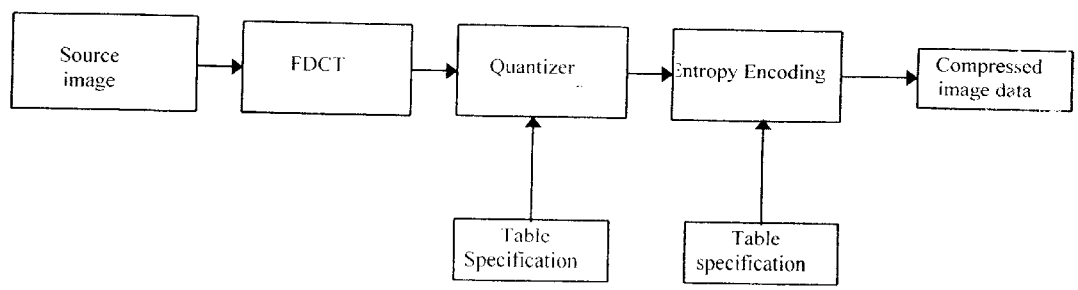
Fig.1 DCT-based Decoder Processing Step
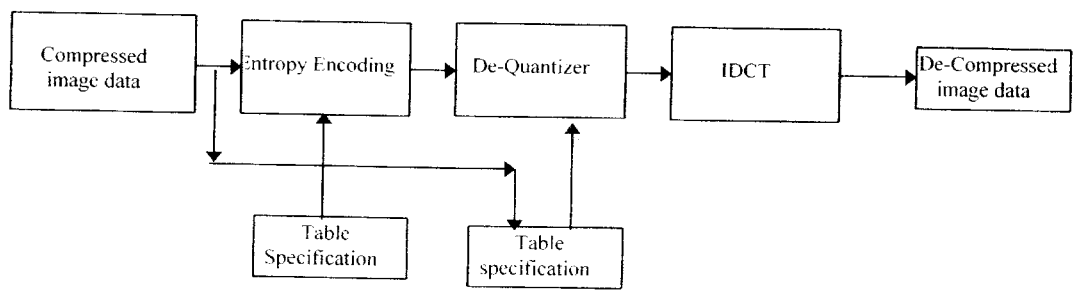
Fig.2 DCT-based Encoder Processing Steps.

Block-diagram of the coding algorithm.

METHOD AND DEVICE FOR IMAGE DIGITIZED DATA COMPRESSION AND DECOMPRESSION

FIELD AND BACKGROUND OF THE INVENTION

The present invention relates to the compression and decompression of digital data corresponding to an image, and in particular to a method and a system for lossy compression and decompression of digital data corresponding to a still image, which gains an improved compression ratio through exploitation of the differential spatial sensitivity of the human eye.

Digital image data can be stored on electronic storage devices and displayed by computer display devices. Such data is conveniently transmitted through networks, such as the Internet. For example, Web pages frequently include one or more graphic images, which are transmitted and displayed as digital image data. Unfortunately, each such graphic image forms a large digital file, which requires a large amount of bandwidth to transmit. A large amount of digital image data is required in order to represent the graphic image. A digital representation of a single color image, at the resolution level of a television picture, contains on the order of one million bytes. Thus, the image data must be compressed as much as possible, for more convenient and efficient storage and transport of the data.

The transformation from an image to a computer digital file basically involves the following steps. First, the image is digitized to produce a numeric matrix of a predetermined, known number of pixels, usually in a 24 bit format. In this format, each 8 bits represents a color component. The matrix is then compressed by an encoder, using one of several known compression methods, in which a mathematical transformation compresses the data into a much smaller file than the original matrix. In reconstructing the image, the compressed file is processed by a decoder, with an inverse transformation to retrieve the original matrix and reconstruct the image on a graphic image display device. If the reversed process yields a matrix identical to the original one than the compression method employed is considered to be "lossless". However, if the reconstructed matrix is not identical, due to a loss of data during the process, then the compression method employed is considered to be "lossy".

An internationally acclaimed standard compression method (and subsequently format standard) is the JPEG (Joint Photographic Expert Group) compression method. The JPEG method is a widely recognized standard for continuous-tone, multi-level still images. This standard was intended to support a large variety of applications for continuous-tone images. JPEG itself actually introduced two basic compression methods, in order to meet the differing needs of many applications: a DCT-based lossy compression method, and a predictive lossless compression method.

The JPEG lossy compression method (see Wallace G.K., "The JPEG Still Picture Compression Standard", IEEE Transactions on Consumer Electronics, Dec. 1991) is performed as follows, and is shown in background art FIGS. 1 and 2. At the input to the encoder, the bits of the source image samples are grouped into blocks of 8×8, shifted from unsigned integers with range $[0, 2^P-1]$, to signed integers with range $[-2^{P-1}, 2^{P-1}-1]$, and input to the Forward Discrete Cosine Transform (FDCT). The DCT is related to the Discrete Fourier Transform (DFT).

Each of the 8×8 blocks of source image is effectively a 64-point discrete signal which is a function of the two spatial dimensions x, y. The FDCT takes the signal as its input and decomposes the signal into 64 orthogonal base signals. Each contains one of the 64 unique two dimensional (2D) "spatial frequencies", which comprise the "spectrum" of the input signal. The output of the FDCT is the set of 64 base-signal amplitudes or "DCT coefficients" whose values are uniquely determined by the particular 64-point input signal. The DCT coefficient values can be regarded as the relative amount of the 2D spatial frequencies contained in the 64-point input signal. The coefficient with zero frequency in both dimensions is called the "DC coefficient" and the remaining 63 coefficients are called "AC coefficients".

Based on the assumption that sample values typically vary slowly from point to point across an image, the FDCT processing step lays the foundation for archiving data compression by concentrating most of the signal in the lower spatial frequencies. For a typically 8×8 sample block from a typical source image, most of the spatial frequencies have zero or near-zero values and need not to be encoded.

After output from the FDCT, each of 64 DCT Coefficients is uniformly quantized in conjunction with a 64-element Quantization Table, which must be specified by the software application as an input to the encoder. Each element may be any integer value ranging from 1 to 256, which specifies the step size of the quantizer for its corresponding DCT coefficient. The purpose of quantization is to achieve further compression by representing DCT coefficients with the minimal precision which is necessary to achieve the desired image quality. Therefore, information which is not visually significant is discarded. Quantization is thus fundamentally a lossy process, and in fact is the principal source of data loss in DCT-based encoders.

After quantization, the DC coefficient is treated separately from the other 63 AC coefficients. The DC coefficient is a measure of the average value of the 64 image samples. Because there is usually a strong correlation between the DC coefficients of adjacent 8×8 blocks, the quantized DC coefficient is encoded as the difference from the DC term of the previous block in the encoding sequence.

Finally, all the quantized coefficients are ordered into a zig-zag sequence, which helps to facilitate entropy coding by placing low-frequency coefficients, with a higher probability of being non-zero, before high-frequency coefficients.

The final DCT-based encoder processing step is entropy coding. This step achieves additional but lossless compression by encoding the quantized DCT coefficients more compactly, according to their statistical characteristics.

Two preferred entropy methods are used in JPEG: Huffman coding and arithmetic coding. The baseline encoder uses Huffman coding, but encoders with both methods are specified for all modes of operation. Essentially entropy coding converts the zig-zag sequence of quantized coefficients into an intermediate sequence of symbols. Then the symbols are converted into a data stream in which the symbols no longer have externally identifiable boundaries to form the compressed image data.

All of these lossy compression methods and improvements attempt to exploit various properties of the human eye and visual perceptual system in order to achieve further compression without any visible error. In fact, after compression with a lossy method, the compressed image is clearly different from the original image when analyzed mathematically. Preferably, these differences are at least not immediately visible to the naked eye. Thus, the compression method is able to achieve even greater compression ratios without visibly altering the quality of the image.

An even more efficient lossy compression method would exploit several physiological idiosyncrasies of the human visual system. First, the eye and the brain are more sensitive to detail found in the darker areas of an image, and less responsive to changes in areas of high light intensity. Second, the human perceptual system is quickly able to detect errors in adjacent pixels which should be the same color. However, when the color significantly changes from one pixel to another, such as at the edge between two objects, the compression algorithm can represent the color of each pixel less accurately without detection of the error by the human visual system, which "corrects" the edge colors by using information from surrounding pixels. Third, the human eye is less sensitive to differences in gray-scale levels than the degree of resolution supported by the JPEG compression method.

BRIEF DESCRIPTION OF THE DRAWINGS

The foregoing and other objects, aspects and advantages will be better understood from the following detailed description of a preferred embodiment of the invention with reference to the drawings, wherein:

FIG. 1 is a schematic block diagram illustrating the background art JPEG compression method (encoding);

FIG. 2 is a schematic block diagram illustrating the background art JPEG decompression method (decoding);

SUMMARY OF THE INVENTION

Figure 3:
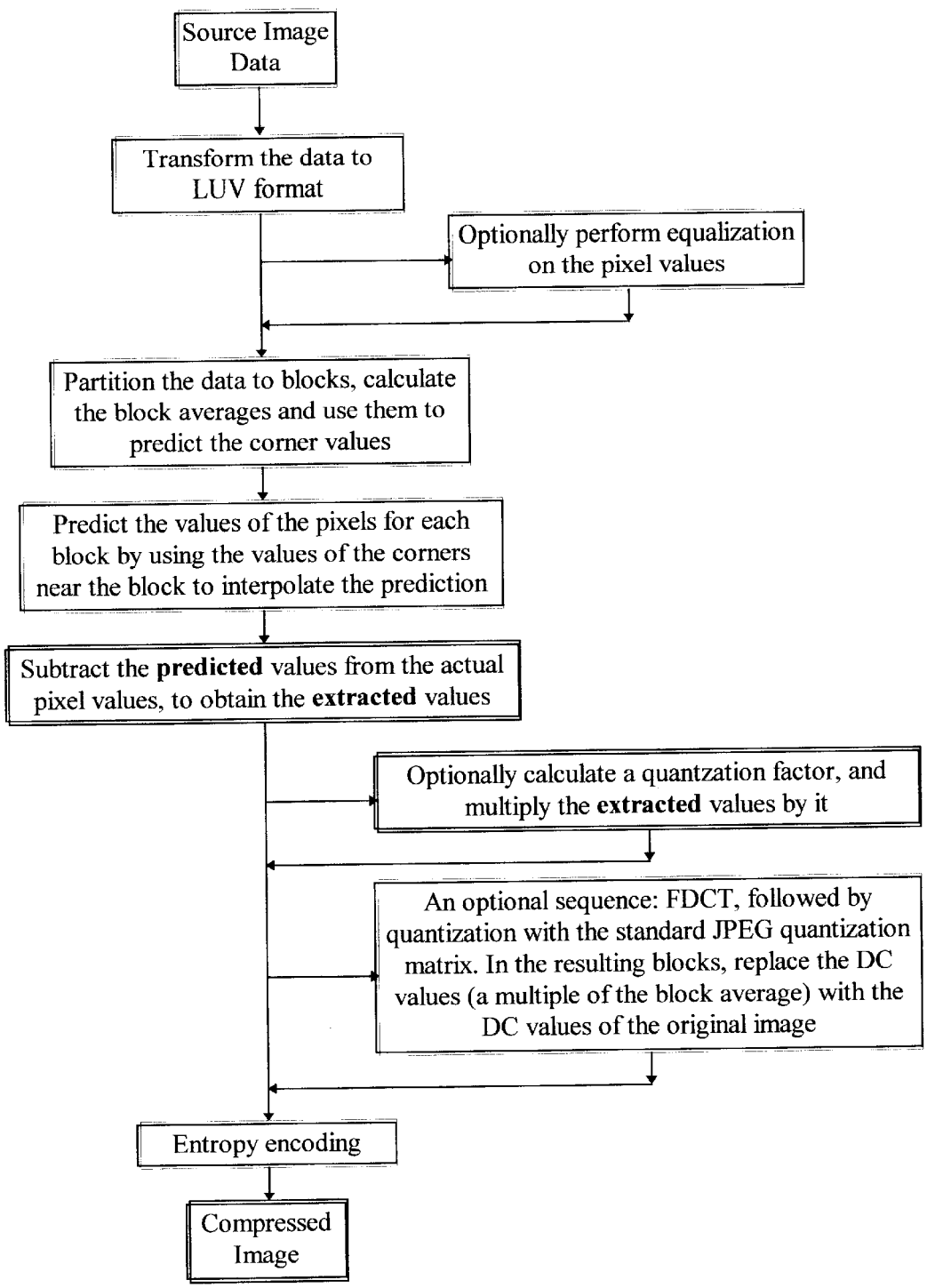
FIG. 3 is a flowchart of an exemplary compression method according to the present invention.

The method of the present invention is relevant both for enhancing compression of still images, in particular those compressed by the JPEG method, and for enhancing compression of motion pictures, in particular those using the MPEG-1 and MPEG-2 methods, for enhancing intra-frame compression.

According to a first embodiment of the present invention, there is provided a method for image digitized data compression, the image data featuring a data format, comprising the steps of: (a) converting the data format of the image data to a format featuring a luminance component and two chrominance components; (b) dividing the image data into a plurality of data blocks; (c) calculating a prediction for an average value at each block corner to form block corner values; (d) calculating a prediction for each image pixel by using an interpolation to form a predicted value for each image pixel; (e) subtracting the predicted value from an actual value for each image pixel to form an extracted value for each image pixel; and (f) compressing the extracted value to form compressed data.

According to another embodiment of the present invention, there is provided a method for efficiently compressing image data, the image data featuring a data format, comprising the steps of: (a) converting the data format of the image data to a format featuring a luminance component and two chrominance components; (b) reducing the plurality of luminance and chrominance levels for each image pixel to form a reduced number of luminance levels with a function for compressing high luminance levels more than low luminance levels to form reduced image pixels; (c) dividing the reduced image pixels into a plurality of data blocks; (d) performing a DCT transform on the plurality of data blocks to form transformed data blocks; and (e) compressing the transformed data blocks with an entropy-encoding compression method.

According to still another embodiment of the present invention, there is provided a method for efficiently compressing image data with a standard compression method, the image data featuring a data format, comprising the steps of: (a) converting the data format of the image data to a format featuring a luminance component and two chrominance components; (b) reducing the plurality of luminance and chrominance levels for each image pixel to form a reduced number of luminance levels with a function for compressing high luminance levels more than low luminance levels to form reduced image pixels; and (c) performing the standard compression method on the reduced image pixels.

Hereinafter, the term "computer" includes, but is not limited to, personal computers (PC) having an operating system such as DOS, Windows™, OS/2™ or Linux; Macintosh™ computers; computers having JAVA™-OS as the operating system; and graphical workstations such as the computers of Sun Microsystems™ and Silicon Graphics™, and other computers having some version of the UNIX operating system; or any other known and available operating system.

The method of the present invention could be described as a series of steps performed by a data processor, and as such could optionally be implemented as software, hardware or firmware, or a combination thereof. For the present invention, a software application could be written in substantially any suitable programming language, which could easily be selected by one of ordinary skill in the art. The programming language chosen should be compatible with the computer hardware and operating system according to which the software application is executed. Examples of suitable programming languages include, but are not limited to, C, C++, FORTRAN and Java.

DESCRIPTION OF THE INVENTION

The method of the present invention is relevant both for enhancing compression of still images, in particular those compressed by the JPEG method, and for enhancing compression of motion pictures, in particular those using the MPEG-1 and MPEG-2 methods, for enhancing intra-frame compression. According to a first embodiment, the method involves at least the steps of transforming the data into the YUV color representation and to a format which features a plurality of blocks; computing a prediction for the average value at each block corner; computing a prediction of each pixel value by using an interpolation; subtracting the predicted value of each pixel from its actual value; and using an entropy-encoding method for compressing the data.

According to a second embodiment, the method may be implemented as a variation on the JPEG compression method, by first transforming the data into the YUV color representation; compressing at least one of the luminance and chrominance levels of the pixels to fewer levels, preferably by compressing both sets of levels; partitioning the image into blocks; performing DCT on the image data; and using an entropy-encoding method to compress the data.

According to a third embodiment, the method of the present invention may be combined with substantially any known image data compression method, such as PNG (Portable Network Graphics) for example, by at least compressing the luminance levels of the pixels to fewer levels, and then performing the remaining steps of the known compression method. Thus, the method of the present invention may optionally be used in its entirety as described below, or alternatively portions may be used with known compression methods, in order to enhance the performance of these known methods.

The method of the present invention preferably is performed with the following steps. The first section explains the compression method with regard to FIG. 3, while the second section explains the decompression method with regard to FIG. 4.

Compression

As shown in FIG. 3, in step 1, the data is transformed from its original form, usually 24 bits per pixel, each 8 bits representing a color component, to a format of 24 bits per pixel that has a luminance component (Y) and two chrominance components (U and V), known as the YUV format. 8 bits represent the luminosity component, 8 bits represent the U color component and 8 bits represent the V color component. This step is performed as recommended by the JPEG standard as part of the pre-processing steps which are preferably performed before the DCT transform is performed, as described in greater detail below.

In step 2, optionally the 256 luminance levels of the image pixels are compressed to fewer levels (111 levels and 128 levels were both found to be good, the recommendation is 105–130 levels), using a function with such properties that the high levels are compressed much more than the low levels.

For example, a suitable function could be:

$$I_1 = I_0\left(1 - e^{-\frac{I}{I_0}}\right),$$

where I is the original luminance level for the pixel, $I_1$ is the computed luminance level of the pixel, and $I_0$ is a constant, that defines the level of compression. If $I_0$=160, the $I_1$ range is 0 through 127. It was experimentally determined that lowering the number of levels below 100 caused visible quality degradation. Increasing $I_0$ simply lowers the compression ratio.

As the human eye does not distinguish well between very low luminance levels, the luminance levels may optionally be further compressed by using a function which also compresses low luminance levels. For example, a first function:

$$I_1 = I_0\left(1 - e^{-\frac{I}{I_0}}\right),$$

could optionally be used for I>80, with $I_0$=160; and a second function $$I_1 = C_1 - I_0\left(1 - e^{-\frac{I}{I_0}}\right),$$

could optionally be used for I<80, with $I_0$=49, where $C_1$=63 is the value of the first function for I=80.

A similar concept is optionally used for the U and V components, except that the range in these components is −128 to +127, and the function used reduced the range to half, namely −63 to +63. For this function, optionally $I_0$=70, and the resulting table is used to reduce 0 through 127 to 0–63 and −1 through −128 to −1 through −63. Note that compressing the U and V components is less effective in image size reduction, because the human eye is less sensitive to these components, thus they are preferably more aggressively compressed later.

Step 2 is an optional step, which may optionally be replaced by step 7 below. Although the result of step 2 does not achieve as much compression as step 7, the process of step 2 is much simpler to calculate than that of step 7.

In step 3, the image is partitioned into rectangular blocks. In particular, a partitioning of 8×8 blocks is recommended, as for the JPEG standard and other similar implementations. For experimentally testing a complete implementation of the method of the present invention, this same block size was used, although alternatively a different block size may be used. For each component (Y, U and V) of each block, the average value is calculated. Optionally and preferably, the average value is stored after being compressed according to a lossless or lossy compression method.

In step 4, a prediction is computed for the average value at each block corner. This is preferably done using bi-cubic interpolation, with a=−0.5 (see for example "Comparison of Interpolating Methods for Image Resampling" by A. Parker, R. V. Kenyon and D. E. Tronell, in IEEE Transactions on Medical Imaging, March 1983). Other interpolations are possible: for example, the average on the 4 blocks surrounding the corner was used, but gave inferior results. An example interpolation equation for obtaining the corner values along a single row:

$$\text{corner}(i)=c1*[\text{block}(I-1)+\text{block}(I+2)]+c2*[\text{block}(I)+\text{block}(I+1)]$$

where $c1=\frac{1}{8}*a$ (and a=−0.5 is recommended), and $c2=\frac{1}{2}-\frac{1}{8}*a$ in which block I is just before corner i, and block I+1 is right after it.

In step 5, a prediction of each image pixel is computed by using an interpolation, preferably bi-cubic interpolation with a=−0.5, in order to form the predicted image. The corner values computed in the previous step are preferably used. Simpler interpolating methods such as 2-dimensional Taylor expansion may optionally be used and were also tested experimentally, but gave inferior results. An example interpolation equation for obtaining the pixel values of the top row in a block:

$$\text{pixel}(k)=a0+a1*k+a2*k^2+a3*k^3$$

where k varies 0 through 7 to obtain the entire row in the block, and a0=r1, a1=$\frac{1}{8}$*(r0−r2)*a $$a2=\tfrac{1}{64}*\{[-r1+r3-2*(r0-r2)]*a+3*(r2-r1)\}$$

$$a3=\tfrac{1}{512}*[(r0-r2+r1-r3)*a-2*(r2-r1)]$$

As mentioned earlier, the recommended value for a is −0.5.

The same equations are used to compute all rows. Then interpolation is done along the columns, using the same equations, except that now the corner values resulting from the interpolation along rows are used instead of the block averages, such that the interpolation equation is:

$$\text{corner2}(j)=c1*[\text{corner}(j-1)+\text{corner}(j+2)]+c2*[\text{corner}(j)+\text{corner}(j+1)]$$

The values of c1 and c2 are as above, and thus a complete set of corner2 values is computed, and these are the final corner values.

When interpolating the top row of a block, r1 is the corner value at the top left of the block, r2 is the corner value at the top right, r0 is the corner value previous to r1 (to the left of r1), r3 is the corner value after r2 (to the right of r2). Also note that for bi-cubic interpolation, interpolation is preferably first performed along the top rows of the blocks using the corner values, then interpolation is performed along all of the columns, using the same equations and using the interpolated row values. Alternatively, the right columns of the blocks may first be calculated, after which all rows are computed.

In step 6, the predicted pixel values are subtracted from the actual values. This is the extraction step, which produces the extracted image.

In step 7, a quantization factor is obtained, and is then used to transform each extracted pixel obtained from step 6. Optionally and preferably, steps 7a–7d are used to perform such a step. As noted previously, step 7 may optionally be replaced by step 2, which although computationally simpler, also results in a lower level of compression.

In step 7a, a mean quantization factor is computed for each block:

$$Qmean = e^{-\frac{s}{s_0}}$$

where S is a function that reflects the block variance and the average pixel intensity in Y, U, V. In particular, 2 functions are recommended:

In the first function, the sum of absolute values of all block coefficients that would be obtained by performing a DCT transform on the predicted image is calculated. Note that if bi-cubic interpolation is used for the predicted image, this function can be directly computed from the block corner values, without doing the DCT transform.

In the second function, the square root of the sum of squares of all block coefficients that would be obtained by performing a DCT transform on the predicted image is determined.

S is the sum of the chosen function on all 3 components- Y, U and V. $S_0$ is a positive number, recommended to be approximately the average of S over the entire image, or approximately the average of S over a large portion of the image whose center is at the image center.

In step 7b, a prediction for the quantization value at each block corner is computed. This is preferably done using bi-cubic interpolation, with a=+0.5 (see for example, "Comparison of Interpolating Methods for Image Resampling" mentioned above for more details on interpolation).

In step 7c, a quantization factor is computed for each image pixel, preferably using bi-cubic interpolation, preferably with a=+0.5. The interpolation method details are optionally and preferably the same as explained in step 5.

In step 7d, each pixel of the extracted image is multiplied by its quantization factor. At this point the chrominance components (U and V) may optionally be discarded, keeping only the block mean values. This results in an image which visually appears to be of high quality to the human eye, but represents colors with less spatial accuracy. If step 2 is performed in place of step 7, the U and V components may be discarded after step 3, keeping only their average for each block.

In step 8, DCT of the image obtained in step 7 is optionally performed. If this step is not performed, then steps 9 and 10 are also not performed. If DCT is not performed, the original block averages are now stored. If the U and V components were not discarded, then at this step, the JPEG compression method standard recommendation to perform chroma subsampling may be followed, which usually means that for every four luminance blocks, 2 blocks of the U component and 2 blocks of the V component are used. This is done because the human eye is less sensitive to details in color.

In step 9, the resulting DC values obtained from the previous step are replaced with the original DC values for each block. A block's DC value obtained by step 8 is predicted by: (original_DC—predicted_DC) *mean_ Quantization. The differences between the actual DC values obtained in step 8 and the predicted DC values obtained in step 9 are stored.

In step 10, standard JPEG quantization is optionally and preferably performed on the results obtained from step 9. However, if step 2 is performed instead of step 7, then at this point the quantization matrix (explained in [REF JPEG]) is preferably multiplied by a factor that is computed per block (an option in the JPEG standard). This factor may be denoted as Q, and is given by the equation:

$$Q = e^{-\frac{s}{s_0}}$$

where S is a function that reflects the block variance. The Q factors are preferably computed according to the predicted AC values rather than the actual AC values. Possible recommended functions for S were previously described above, with regard to step 7a. Note that using the sum of absolute values of all block coefficients which would be obtained by performing a DCT transform on the predicted image can be performed with relatively few calculations, and is therefore recommended.

In step 11, entropy-encoding methods (for example runlength encoding to compress the abundant zeroes, then Huffman coding or arithmetic coding) are used to compress the data. This step achieves additional compression losslessly. In particular, the JPEG standard, the GIF standard and the PNG standard offer methods to achieve this. The PNG standard is described in the PNG Specification Version 1.0 (W3C Recommendation of Oct. 1, 1996; ed. by T. Boutell and T. Lane, by M. Adler et al.; also referred to as RFC 2083).

The JPEG method performs lossless compression on block DC values by storing the difference between a DC value and the preceding such DC value. This stored data may optionally be further compressed by permitting data loss if the difference is large. For example, differences in the +4 range may optionally be stored accurately, while larger differences may be allowed to be inaccurate. In addition, the first DC difference in a row may be stored as a difference from the DC value above it.

Decompression

Figure 4:
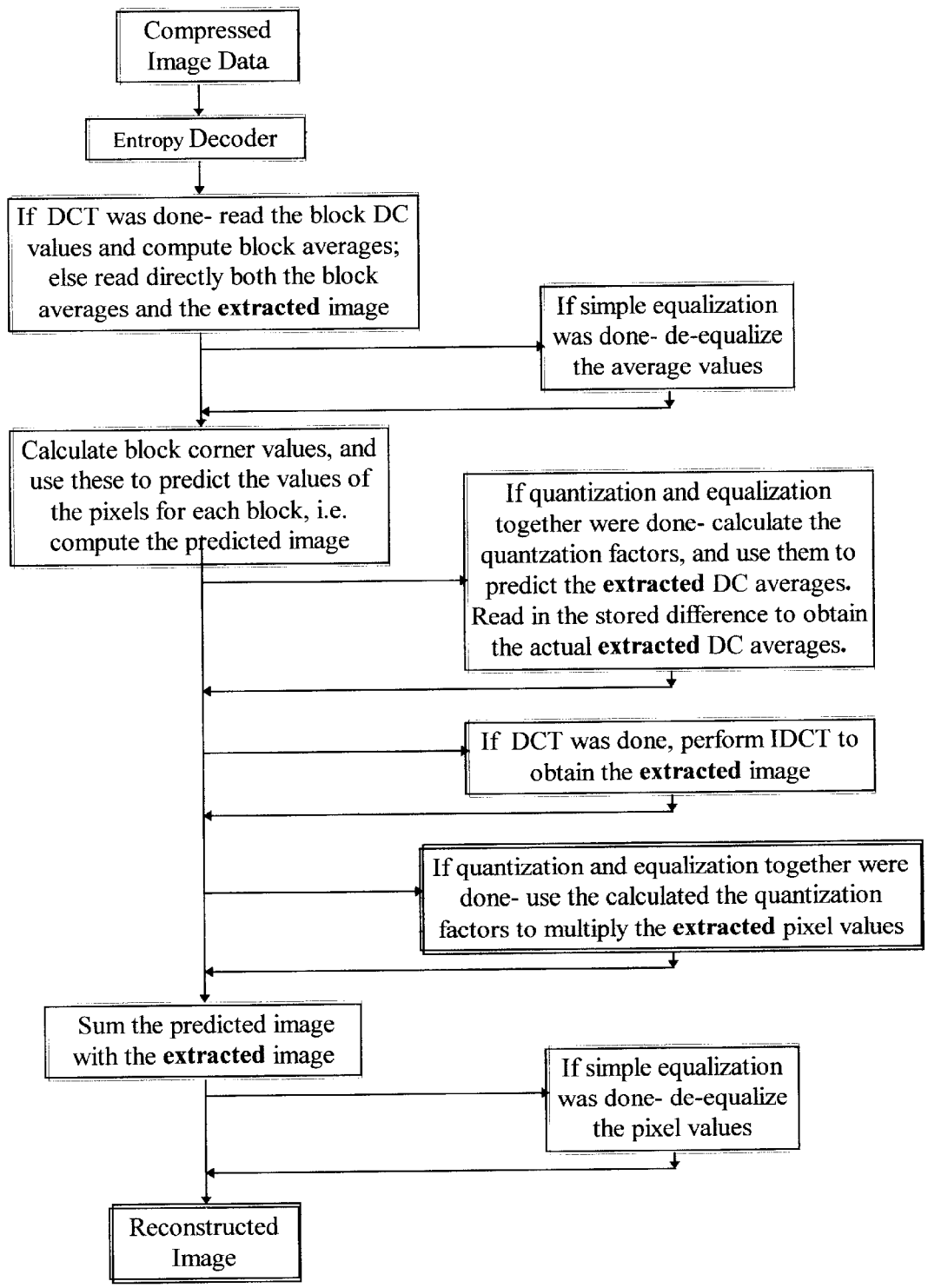
FIG. 4 is a flowchart of an exemplary decompression method according to the present invention.

The decompression method effectively performs the inverse of the compression method, as shown in FIG. 4. As the compression method may feature a number of optional steps, the description of the decompression method contains a lot of conditional statements, such that a particular decompression step only should be performed if a certain optional step is used during compression. In practice, the compressed image may contain a few bits that specify exactly what options were chosen during compression, thus allowing a single decompressor to decompress images compressed with a variety of options. The two main compression alternatives correspond to the case where step 7 (equalization with quantization) is performed, or alternatively where such a quantization step is not performed, in which case step 2 may be done instead.

In step 1 of the decompression method, entropy decoding is performed, preferably featuring either Huffman or arithmetic entropy decoding. If run-length encoding was also used for the encoding step in the compression method, then run-length decoding should also be performed.

In step 2, the predicted image is calculated by using the mean values. If DCT had not been previously performed for the compression method, then these values were directly stored and are available now. If DCT had been previously performed, they can be obtained directly from the DC values, which were stored in compression step 9. The predicted image is now calculated by performing steps 4 and 5 of the compression method again.

In step 3, if the compression included mean quantization factors, such that optional compression step 7 was performed, then perform compression step 7a to compute the mean quantization factor per block. Next, each pixel of the predicted image should be divided by its calculated quantization factor.

The following three decompression steps, steps 4–6, are performed only if the compression method included DCT; otherwise they are skipped. In step 4, de-quantization is performed. Also, if the quantization matrix was multiplied by a per-block Q-factor, then the Q-factors should be computed before the de-quantization, and then used to multiply the quantization matrix.

In step 5, the current DC values of each block (these are the original image DC values) are replaced with the extracted image DC values. If compression step 7 was not performed, then step 5 is simply performed as: original_DC—predicted_DC. Alternatively, if compression step 7 was performed, then the following equation should be used instead: (original_DC—predicted_DC)*mean_Quantization. Next, the corrections stored in step 8 of the compression are used to obtain the final DC values of the extracted image.

In step 6, IDCT (Inverse Discrete Cosine Transform) [REF JPEG] is performed to obtain the extracted image.

Step 7 is performed if the compression included mean quantization factors, such that compression step 7 was performed. The per-pixel quantization factors are now computed (sub-steps 7b and 7c of the compression process). The extracted image pixels (obtained either in decompression step 1 or 6) are divided by their quantization factors.

In step 8, the predicted image (calculated in decompression step 2 and in some cases also decompression step 3) is added to the extracted image.

In step 9, if the compression method included step 2 (equalizing) then a step of de-equalizing is performed, by using the inverse of the function used in the equalization step, as described in step 2 of the compression method. For example, if the luminance levels were compressed using the function:

$$I_1 = I_0\left(1 - e^{-\frac{I}{I_0}}\right), \text{ then use: } I = -I_0\ln\left(1 - \frac{I_1}{I_0}\right),$$

where I is the original luminance level for the pixel, $I_1$ is the computed luminance level of the pixel, and $I_0$ is a constant, that defines the level of compression.

In step 10, the resultant image is now decompressed. Optionally, the image is now converted from YUV to RGB, in order to be ready to display.

While the invention has been described with respect to a limited number of embodiments, it will be appreciated that many variations, modifications and other applications of the invention may be made.

What is claimed is:

1. A method for image digitized data compression, the image data featuring a data format, comprising the steps of:
   (a) converting the data format of the image data to a format featuring a luminance component and two chrominance components;
   (b) dividing the image data into a plurality of data blocks;
   (c) calculating a prediction for an average value at each block corner to form block corner values;
   (d) calculating a prediction for each image pixel by using an interpolation to form a predicted value for each image pixel;
   (e) subtracting said predicted value from an actual value for each image pixel to form an extracted value for each image pixel; and
   (f) compressing said extracted value to form compressed data;

wherein each image pixel features a plurality of luminance levels and step (a) further comprises the step of reducing said plurality of luminance and chrominance levels for each image pixel to form a reduced number of luminance levels with a function for compressing high luminance levels more than low luminance levels.

2. The method of claim 1, wherein said plurality of luminance and chrominance levels is 256 levels, and said reduced number of luminance and chrominance levels is in a range of from about 105 levels to about 130 levels.

3. The method of claim 2, wherein said plurality of luminance levels is further reduced with a function for compressing the low luminance levels more than higher luminance levels, such that said reduced number of luminance and chrominance levels is in a range of from about 70 levels to about 105 levels.

4. The method of claim 1, wherein said interpolation of step (d) is a bi-cubic interpolation.

5. The method of claim 4, wherein step (c) is performed with a bi-cubic interpolation function.

6. A method for image digitized data compression, the image data featuring a data format, comprising the steps of:
   (a) converting the data format of the image data to a format featuring a luminance component and two chrominance components;
   (b) dividing the image data into a plurality of data blocks;
   (c) calculating a prediction for an average value at each block corner to form block corner values;
   (d) calculating a prediction for each image pixel by using an interpolation to form a predicted value for each image pixel;
   (e) subtracting said predicted value from an actual value for each image pixel to form an extracted value for each image pixel;
   (f) obtaining a quantization factor;
   (g) transforming each extracted pixel according to said quantization factor to form a transformed pixel; and
   (h) compressing said extracted value to form compressed data;
      wherein said quantization factor is computed by calculating an equation:

$$Qmean = e^{-\frac{S}{S_0}}$$

where S is a function for reflecting the block variance and an average pixel intensity in Y, U, V and $S_0$ is a positive number.

7. The method of claim 6, wherein said function S determines a sum of absolute values of all block coefficients obtained by performing a DCT transform on said predicted value for each pixel.

8. The method of claim 6, wherein said function S determines a square root of a sum of squares of all block coefficients obtained by performing a DCT transform on said predicted value for each pixel.

9. The method of claim 6, wherein step (c) is performed with a bi-cubic interpolation function, such that said function S computes a sum of absolute values of calculated directly from said block corner values.

10. The method of claim 6, wherein $S_0$ is the average of function S over at least a portion of the image.

11. The method of claim 6, wherein step (i) further comprises the steps of:
   (1) computing a prediction for a quantization value at each block corner; and
   (2) computing a quantization factor for each image pixel; and wherein step (ii) is performed by multiplying each extracted pixel by said quantization factor.

12. The method of claim 11, wherein step (2) is performed with bi-cubic interpolation.

13. The method of claim 11, further comprising the step of:
   (iii) discarding said chrominance components.

14. The method of claim 6, further comprising the step of:
   (iii) performing a DCT of said transformed pixel to form DC values.

15. The method of claim 14, further comprising the step of:
   (iv) calculating predicted DC values for said predicted value for each pixel.

16. The method of claim 15, further comprising the step of:
   (v) performing standard JPEG quantization on said predicted DC values.

17. The method of claim 16, further comprising the step of:
   (g) compressing said compressed data according to an entropy-encoding method of compression.

18. The method of claim 17, further comprising the step of:
   (g) decompressing said compressed data to form decompressed data.

19. The method of claim 18, wherein step (g) further comprises the steps of:
   (i) performing entropy decoding on said compressed data;
   (ii) calculating a predicted image with average values for said compressed data;
   (iii) replacing current DC values for each block with extracted image DC values; and
   (iv) adding said predicted image values to said extracted image DC values.

* * * * *